US00RE50705E

(19) United States
(12) Reissued Patent
Guan

(10) Patent Number: US RE50,705 E
(45) Date of Reissued Patent: Dec. 23, 2025

(54) COMBINED BIRD FEEDER WITH CAMERA

(71) Applicant: Netvue Technologies Co., Ltd., Guangdong (CN)

(72) Inventor: ZhenXuan Guan, Shenzhen (CN)

(21) Appl. No.: 29/974,278

(22) Filed: Nov. 29, 2024

Related U.S. Patent Documents

Reissue of:
(64) Patent No.: Des. 983,859
Issued: Apr. 18, 2023
Appl. No.: 29/839,134
Filed: May 18, 2022

(51) LOC (15) Cl. ..... 16-01
(52) U.S. Cl.
USPC ..... D16/208
(58) Field of Classification Search
USPC ..... D30/124, 126, 128, 129; D16/201, 202, D16/203, 208; D10/106.4
CPC ..... A01K 29/005; A01K 31/14; A01K 39/01
See application file for complete search history.

(56) References Cited

U.S. PATENT DOCUMENTS

| | | | | | |
|---|---|---|---|---|---|
| D115,321 | S | * | 6/1939 | Pueschel | 119/52.2 |
| D217,470 | S | * | 5/1970 | Morrow | D30/128 |
| 5,033,411 | A | * | 7/1991 | Brucker | A01K 39/012 119/52.2 |
| D370,313 | S | * | 5/1996 | Nottingham | D30/111 |
| D426,352 | S | * | 6/2000 | Zernov | D30/125 |
| D428,537 | S | * | 7/2000 | Miller | D30/124 |
| D533,566 | S | * | 12/2006 | Lee | D14/496 |
| D542,480 | S | * | 5/2007 | Barszcz | D30/128 |
| D546,506 | S | * | 7/2007 | Barszcz | D30/128 |
| 7,370,607 | B2 | * | 5/2008 | O'Dell | A01K 39/012 D30/128 |
| D578,138 | S | * | 10/2008 | Sheba | D14/496 |
| D636,006 | S | * | 4/2011 | Champ | D16/202 |
| D659,732 | S | * | 5/2012 | Kim | D16/202 |

(Continued)

OTHER PUBLICATIONS

"Technaxx Bird Feeder Camera Station with Treat Hanging, 150 g Box for Food & Bath for Water—FullHD Video Resolution—Versatile Installation Kit—Smart Birdhouse with Video Camera TX-165 Green" from Amazon.com, first retrieved Sep. 7, 2022 from the internet <https://www.amazon.com/Technaxx-Feeder-Camera-Station-Hanging/dp/B09PPZZX2H/> (Year: 2022).*

(Continued)

*Primary Examiner* — Philip S Hyder

(57) CLAIM

The ornamental design for a combined bird feeder with camera, as shown and described.

DESCRIPTION

FIG. 1 is a front and top perspective view of a combined bird feeder with camera, showing my new design;
FIG. 2 is a rear and bottom perspective view thereof;
FIG. 3 is a front elevation view thereof;
FIG. 4 is a rear elevation view thereof;
FIG. 5 is a left side elevation view thereof;
FIG. 6 is a right side elevation view thereof;
FIG. 7 is a top plan view thereof;
FIG. 8 is a bottom plan view thereof;
FIG. 9 is an enlarged portion view taken from encircled portion labeled, "FIG. 9" in FIG. 1; and,
FIG. 10 is another perspective view thereof, shown in an alternative position.
The even broken lines in the figures illustrate portions of the combined bird feeder with camera that form no part of the claimed design. The dash dot dash lines in FIGS. 1 and 9 are for the purpose of depicting the boundary line of the enlarged view and form no part of the claim.

1 Claim, 10 Drawing Sheets

Figure 1:
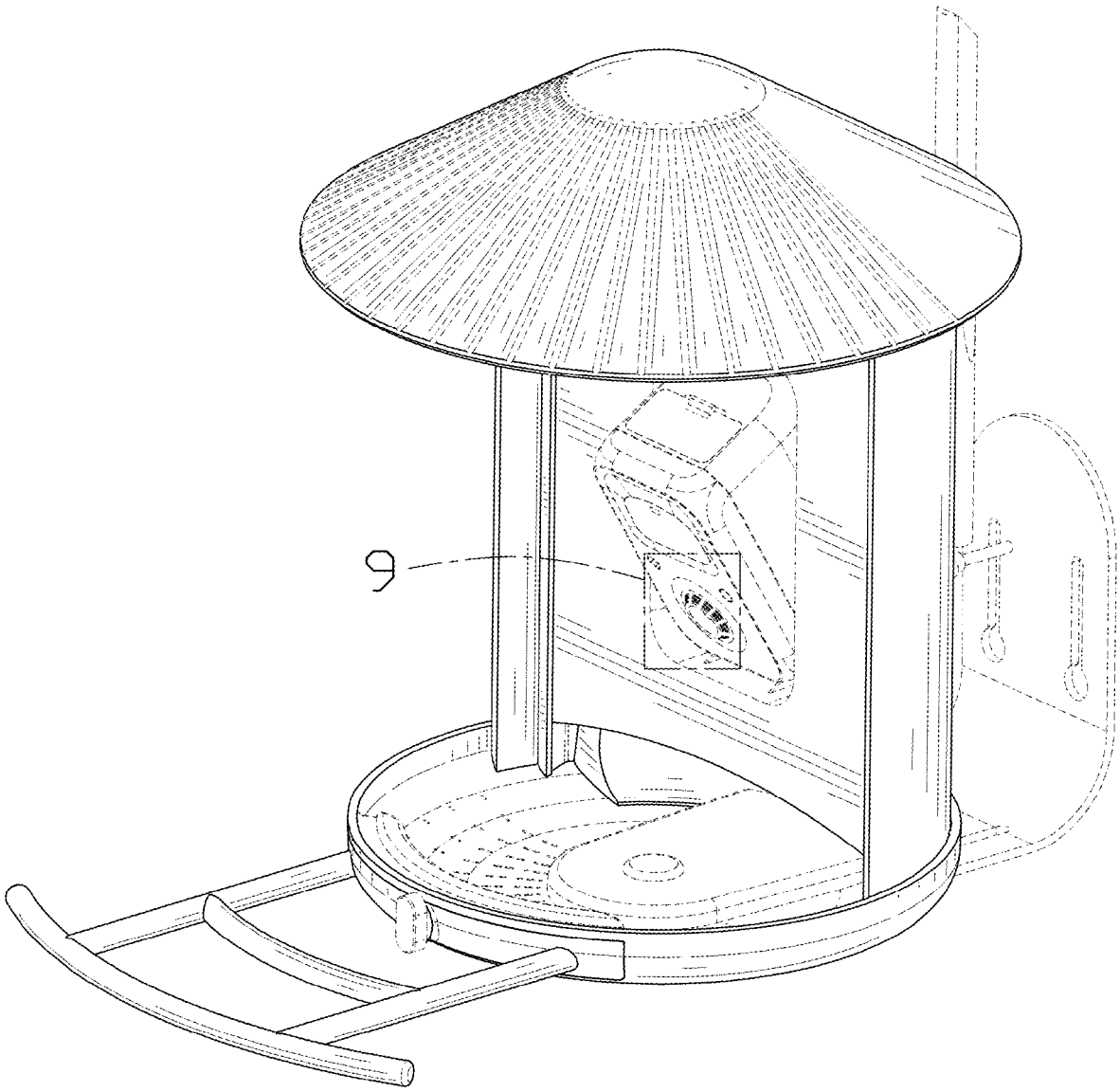
Figure 2:
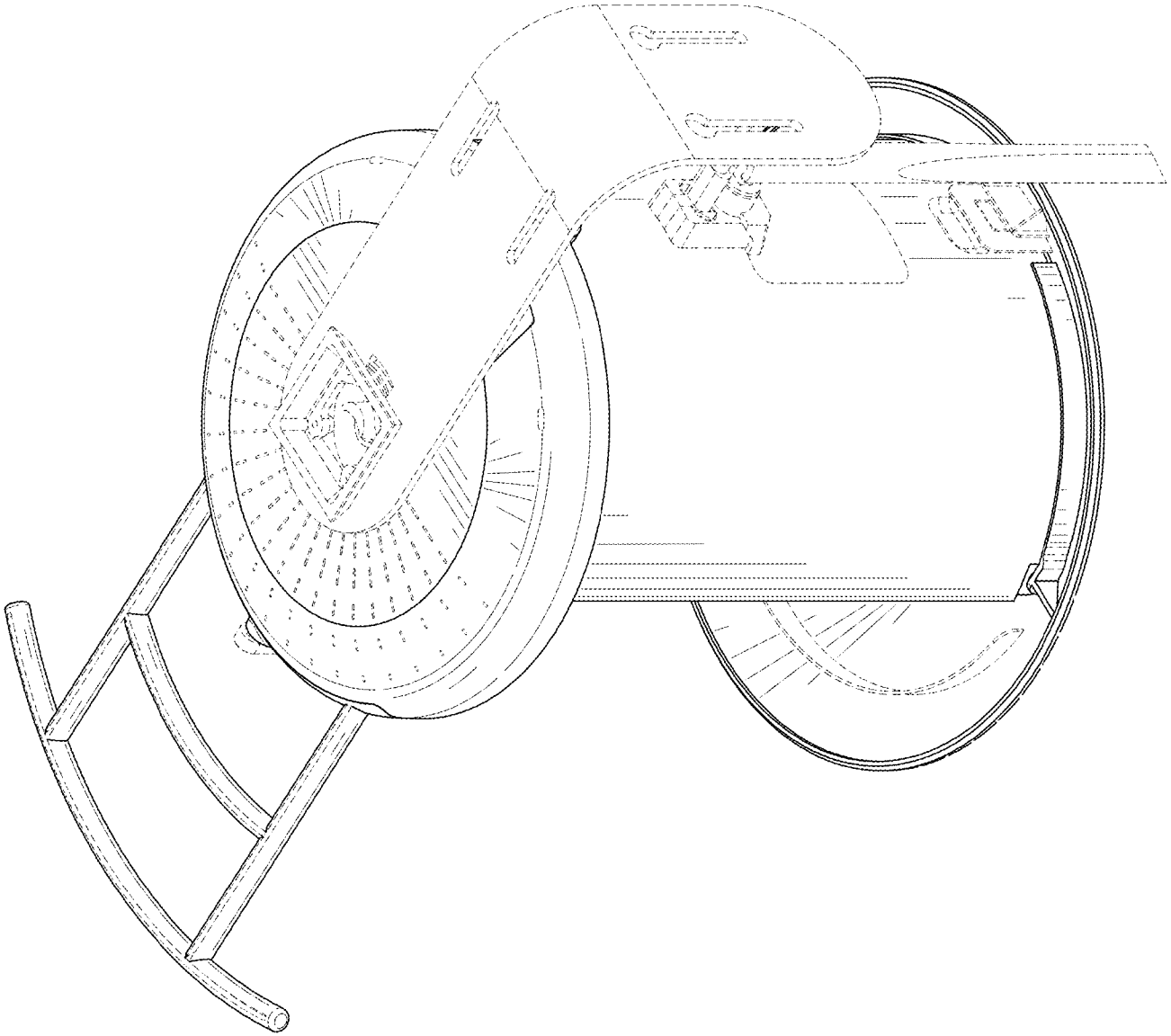
Figure 3:
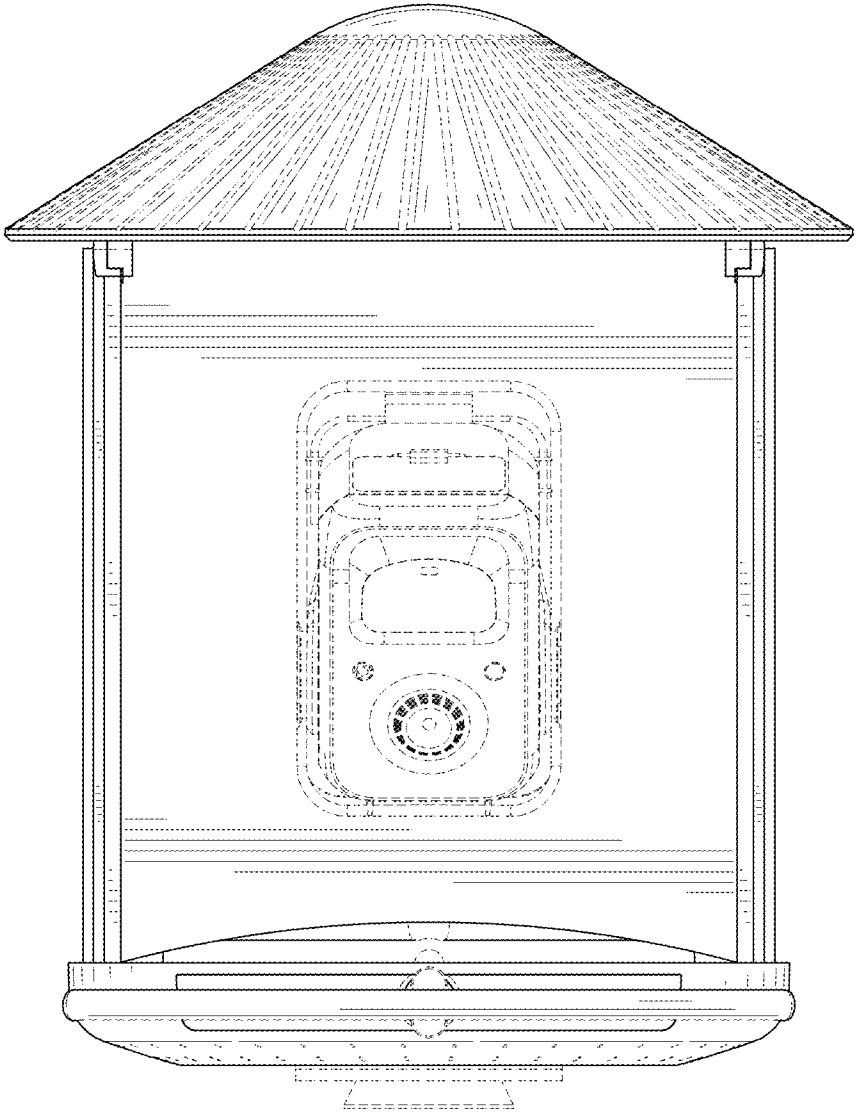
Figure 4:
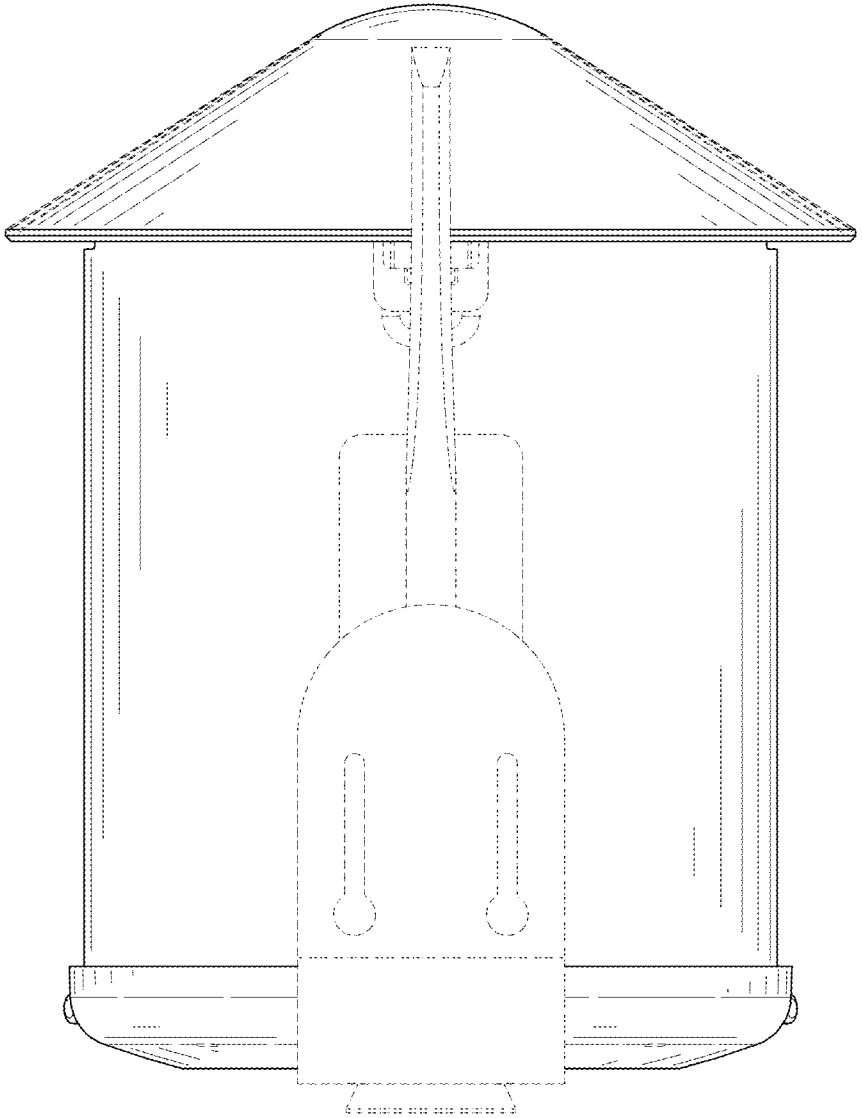
Figure 5:
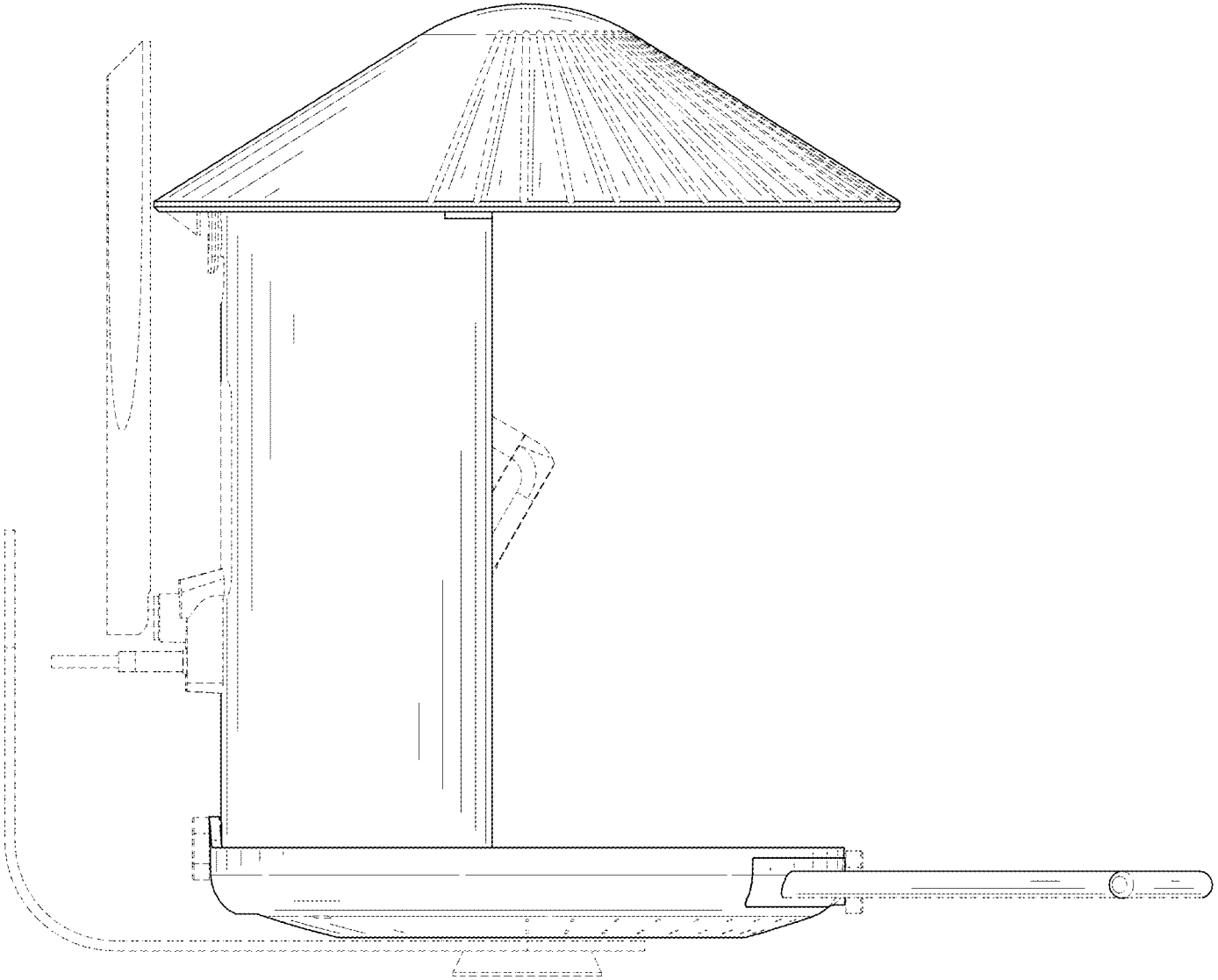
Figure 6:
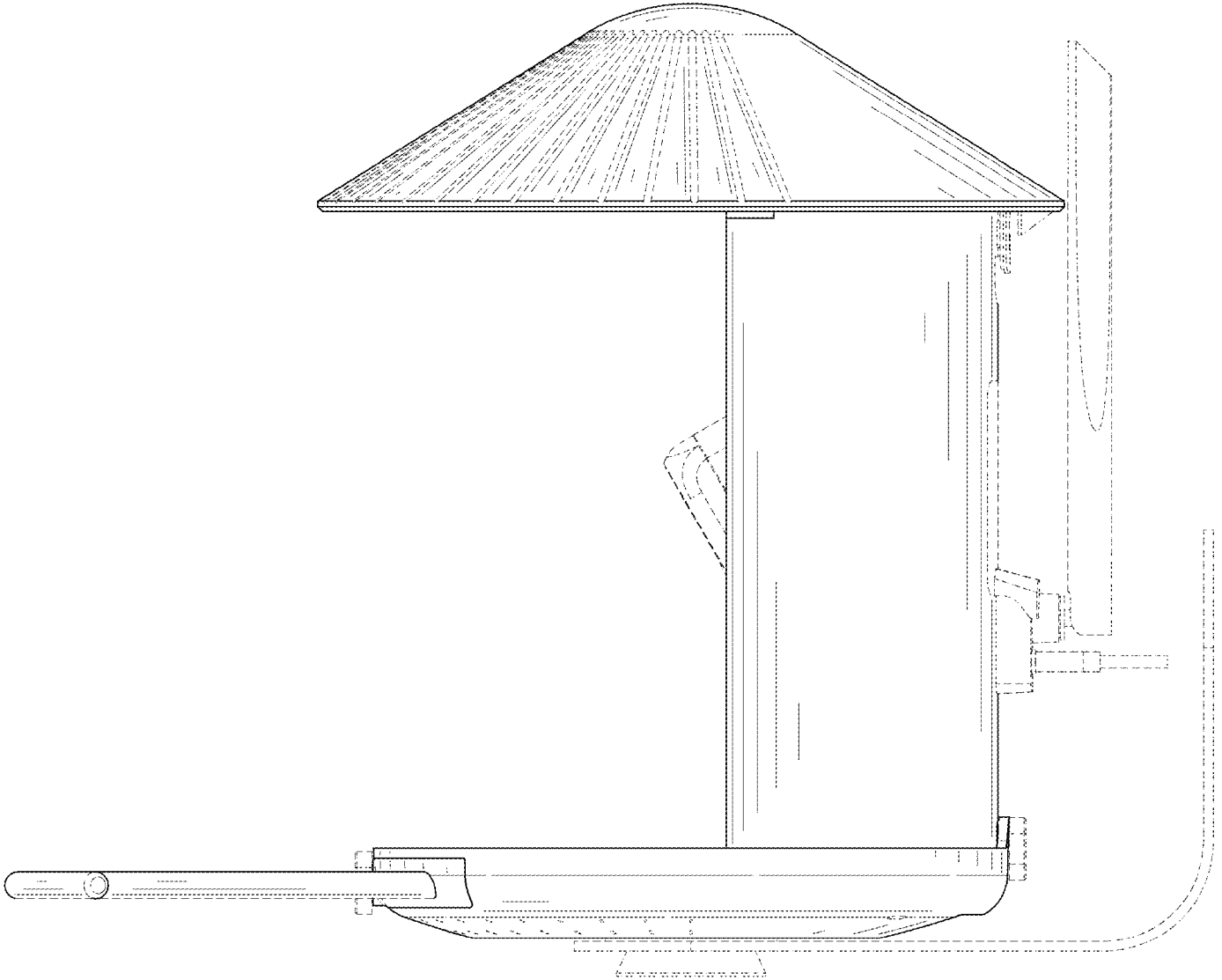
Figure 7:
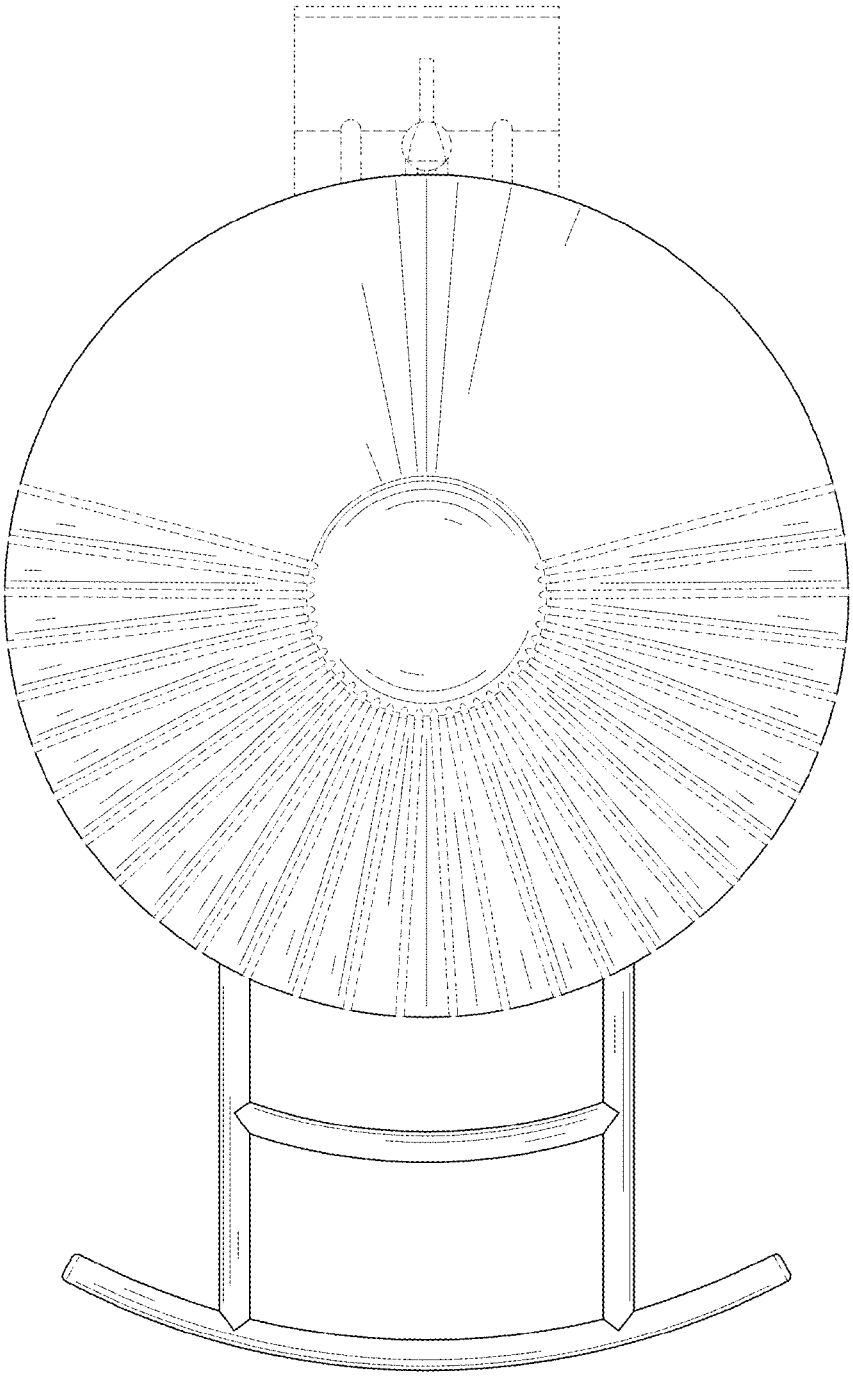
Figure 8:
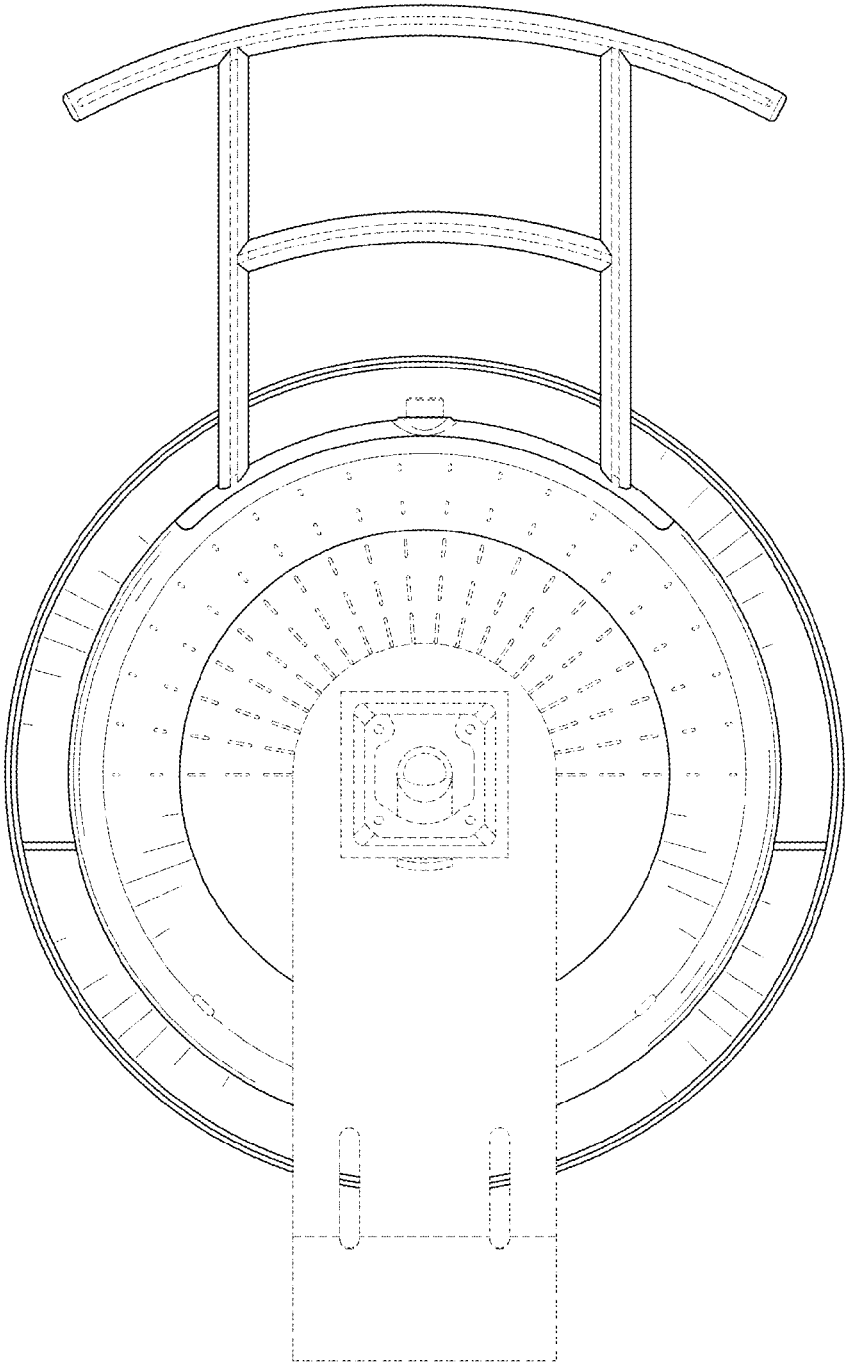
Figure 9:
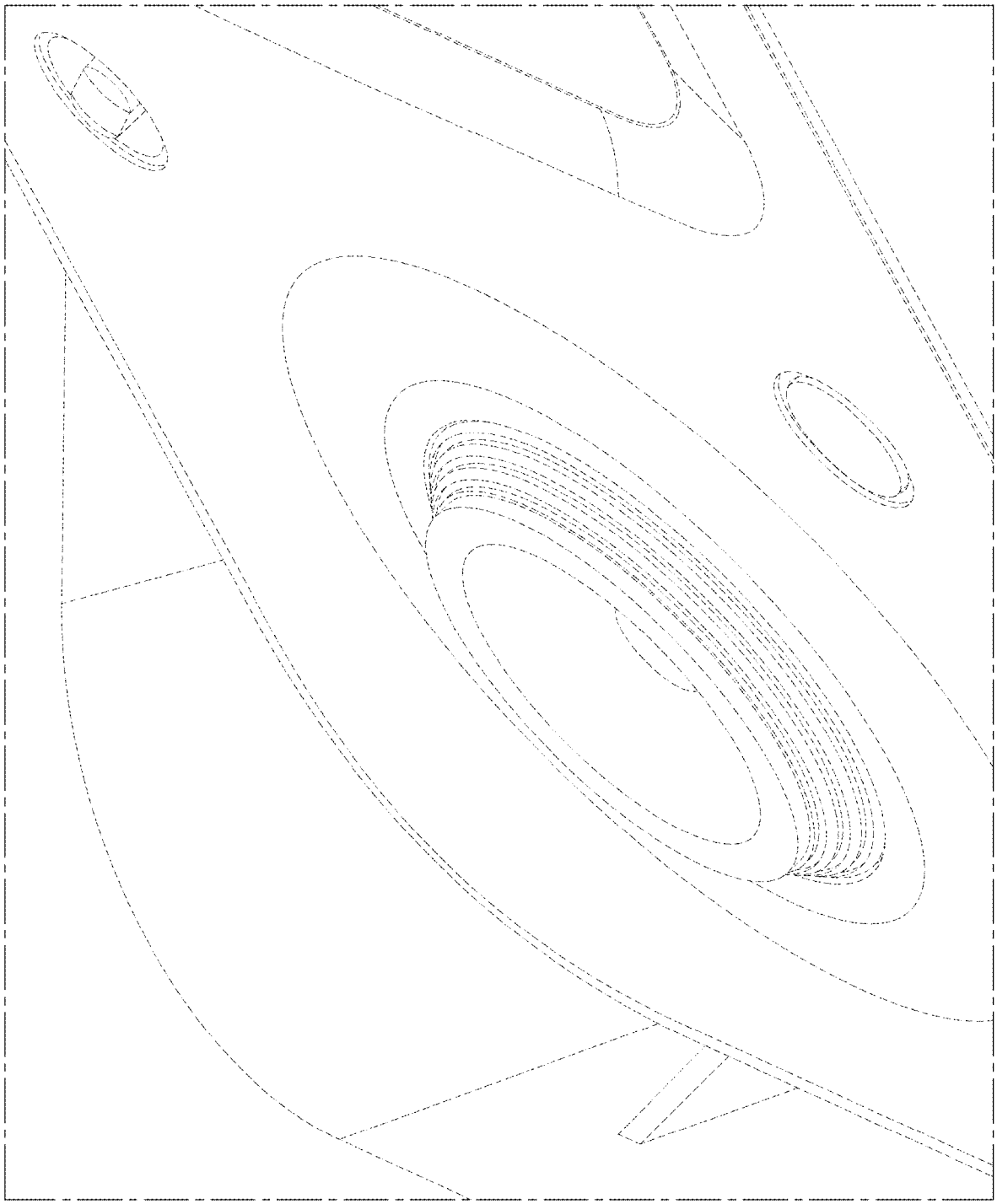
Figure 10:
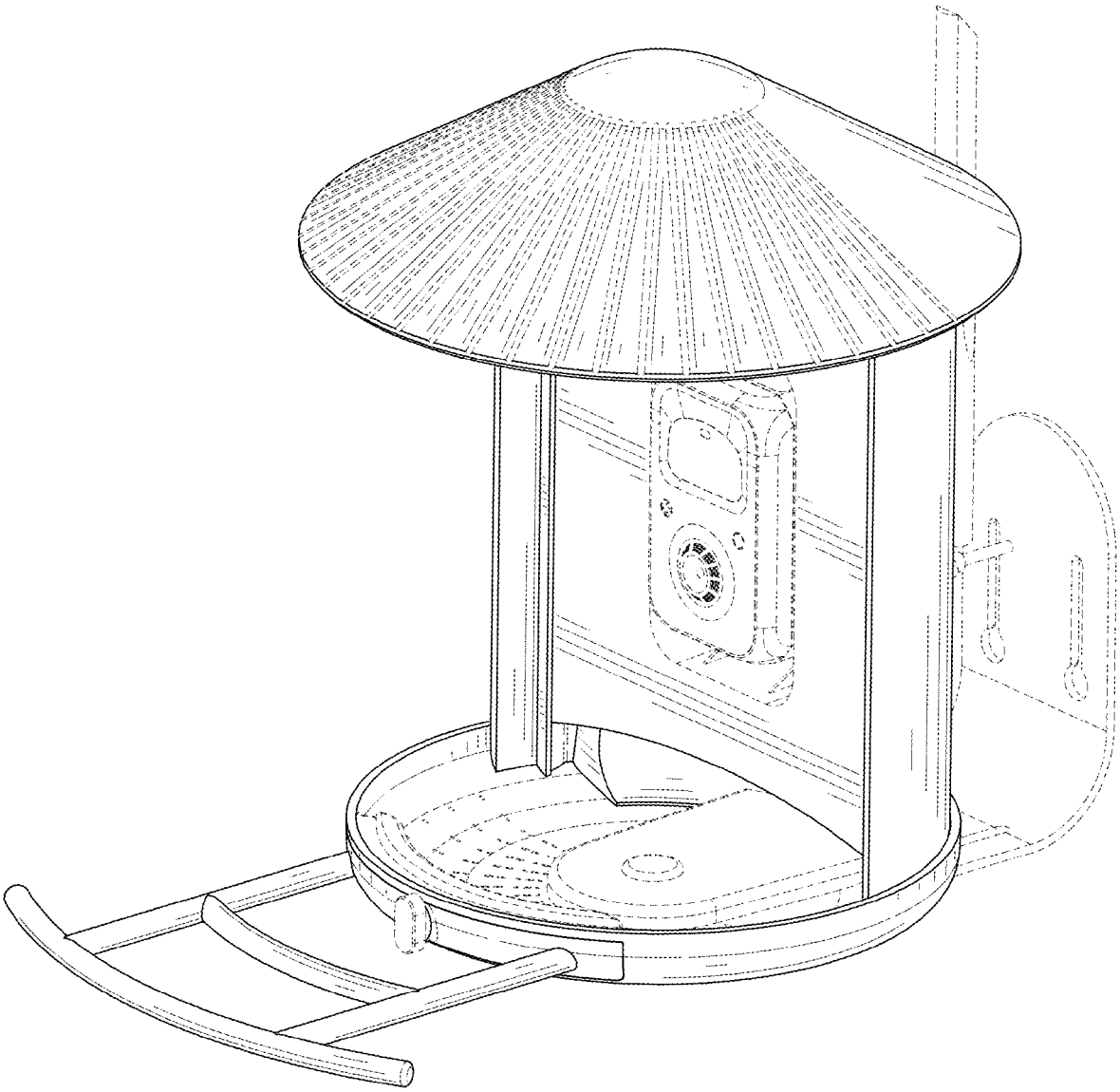

Matter enclosed in heavy brackets [ ] appears in the original patent but forms no part of this reissue; matter printed in italics indicates the additions made by reissue.

Amended

Amended

(56) References Cited

U.S. PATENT DOCUMENTS

| | | | | | |
|---|---|---|---|---|---|
| D666,659 | S | * | 9/2012 | Furlan | D16/202 |
| D671,584 | S | * | 11/2012 | Ohno | D16/202 |
| D679,453 | S | * | 4/2013 | Krueger | D30/127 |
| D698,379 | S | * | 1/2014 | Lee | D16/202 |
| D715,846 | S | * | 10/2014 | Troxel | D16/202 |
| D727,575 | S | * | 4/2015 | Schroeder | D30/127 |
| D755,875 | S | * | 5/2016 | Geng | H01N 5/2251 D16/203 |
| D760,963 | S | * | 7/2016 | Delman | D30/131 |
| D770,553 | S | * | 11/2016 | Schield | D16/202 |
| D794,694 | S | * | 8/2017 | Liu | D16/203 |
| D802,644 | S | * | 11/2017 | Lee | D16/202 |
| D809,717 | S | * | 2/2018 | Pritham | D30/127 |
| D889,051 | S | | 6/2020 | Combs et al. | |
| D920,593 | S | * | 5/2021 | Haney | D30/127 |
| D977,201 | S | * | 1/2023 | Zheng | D30/127 |
| D1,013,972 | S | * | 2/2024 | Lin | D16/208 |
| 2016/0156989 | A1 | * | 6/2016 | Lovett | H04N 7/183 348/143 |
| 2017/0195551 | A1 | * | 7/2017 | Klein | H04N 7/188 |
| 2023/0027590 | A1 | * | 1/2023 | Hu | G06V 40/103 |
| 2023/0148570 | A1 | * | 5/2023 | Pekcan | A01K 29/005 119/429 |
| 2023/0270078 | A1 | * | 8/2023 | Buzzard | A01K 29/005 |

OTHER PUBLICATIONS

"Fussbric Smart Bird Feeder with Camera, App Notification, AI Recognition and Automatic Bird Sensing, Bird House Bird Feeder with Built-in Microphone, Outdoor Wild Bird feeders Popular with Birds,Green" from Amazon.com, first retrieved Sep. 7, 2022 from the internet <https://www.amazon.com/Fussbric-Notification-Recognition-Automatic-Microphone/dp/B09JFRBMTR?th=1> (Year: 2022).*

"NETVUE Birdfy Lite—Smart Bird Feeder Camera, Bird Watching Camera Auto Capture Bird Videos & Motion Detection, Bird House Camera, Ideal Gift for Family" from Amazon.com, first available Jun. 27, 2022 from the internet <https://www.amazon.com/dp/B0B56BFH7P/> (Year: 2022).*

* cited by examiner

Amended

Amended

Amended

Amended

Amended

Amended

Amended

Amended

Amended

Amended